United States Patent
Buck et al.

(10) Patent No.: US 6,996,909 B1
(45) Date of Patent: Feb. 14, 2006

(54) BATTERY POWERED CIRCULAR SAW

(75) Inventors: John E. Buck, Cockeysville, MD (US);
James P. Bascom, Bel Air, MD (US);
Keith Moore, Owings Mills, MD (US)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 09/133,923

(22) Filed: Aug. 13, 1998

Related U.S. Application Data

(63) Continuation-in-part of application No. 09/133,924, filed on Aug. 13, 1998, now Pat. No. 6,057,608.

(51) Int. Cl.
*B23D 45/16* (2006.01)

(52) U.S. Cl. .............................. 30/388; 30/389; 30/391; 30/DIG. 1

(58) Field of Classification Search ............ 30/DIG. 1, 30/375, 377, 388, 391, 389; 310/50, 47, 310/60
See application file for complete search history.

(56) References Cited

U.S. PATENT DOCUMENTS

| | | | | |
|---|---|---|---|---|
| 2,962,062 A | | 11/1960 | Winkler et al. ............... 143/43 |
| 3,262,472 A | | 7/1966 | McCarty et al. ............... 143/43 |
| 3,292,673 A | | 12/1966 | Gregory ...................... 143/43 |
| 3,447,577 A | | 6/1969 | Burrows et al. ............... 143/43 |
| 3,706,332 A | | 12/1972 | George ....................... 143/159 |
| 3,730,239 A | | 5/1973 | Kaman et al. .......... 143/159 H |
| 3,757,194 A | | 9/1973 | Weber et al. .................. 320/2 |
| 4,084,123 A | * | 4/1978 | Lineback et al. .............. 320/2 |
| 4,221,051 A | | 9/1980 | Glass ......................... 30/377 |
| 4,353,165 A | | 10/1982 | Albery ....................... 30/376 |
| 4,516,324 A | | 5/1985 | Heininger, Jr. et al. ....... 30/377 |
| 4,555,849 A | | 12/1985 | Ando et al. .................. 30/388 |
| 4,589,208 A | | 5/1986 | Iwasaki et al. |
| 4,616,169 A | * | 10/1986 | Proffitt ......................... 320/2 |
| 4,847,513 A | | 7/1989 | Katz et al. ................... 307/149 |

(Continued)

FOREIGN PATENT DOCUMENTS

DE    DE 39 19 702    11/1991

(Continued)

OTHER PUBLICATIONS

Makita 1993 Catalog, four pages including cover page, pp. 17 and 19, and back page (dated 1993).

*Primary Examiner*—Allan N. Shoap
*Assistant Examiner*—Omar Flores Sánchez
(74) *Attorney, Agent, or Firm*—Harness, Dickey & Pierce, P.L.C.

(57) ABSTRACT

A battery powered circular saw includes a rechargeable battery removably attached to the housing and an adjustable shoe pivotally attached to a guard assembly for controlling a depth of cut. A locking mechanism for preventing relative movement between the adjustable shoe and the housing includes a depth of cut strap disposed adjacent a first sidewall of the housing. A lever is disposed adjacent a second sidewall of the housing. A tightening element interconnects the depth of cut strap and the lever. The battery powered circular saw additionally includes a handle extending from the housing. The handle is disposed substantially parallel to a direction of cut and oriented horizontally above the housing. The rechargeable battery pack includes a pair of laterally spaced apart guide rails which cooperate with the pair of longitudinally extending grooves to permit sliding movement of the rechargeable battery pack in a direction parallel to the direction of cut.

34 Claims, 5 Drawing Sheets

U.S. PATENT DOCUMENTS

| | | | |
|---|---|---|---|
| 4,856,394 A | 8/1989 | Clowers | 83/56 |
| 4,982,501 A | 1/1991 | Sauerwein et al. | 30/376 |
| 5,010,651 A | 4/1991 | Techter et al. | 30/376 |
| 5,381,602 A | 1/1995 | Matzo et al. | 30/377 |
| D363,656 S * | 10/1995 | Gierke | 30/388 |
| 5,454,167 A | 10/1995 | Albery | 30/377 |
| 5,517,763 A | 5/1996 | Schilling et al. | 30/376 |
| 5,699,705 A * | 12/1997 | Sibbet | 30/391 |
| 5,881,823 A * | 3/1999 | Kabatnik et al. | 310/47 |
| 6,775,913 B1 * | 8/2004 | Fey et al. | 30/388 |

FOREIGN PATENT DOCUMENTS

| | | |
|---|---|---|
| DE | G 91 15 492.8 | 4/1992 |
| DE | DE 44 03 189 | 8/1995 |
| DE | DE 34 29 095 | 1/1997 |
| DE | DE 295 13 330 | 2/1997 |
| JP | 59-140001 | 8/1984 |
| JP | 7-52067 | 2/1995 |
| JP | 9-164501 | 6/1997 |
| WO | WO 98 25723 | 6/1998 |

* cited by examiner

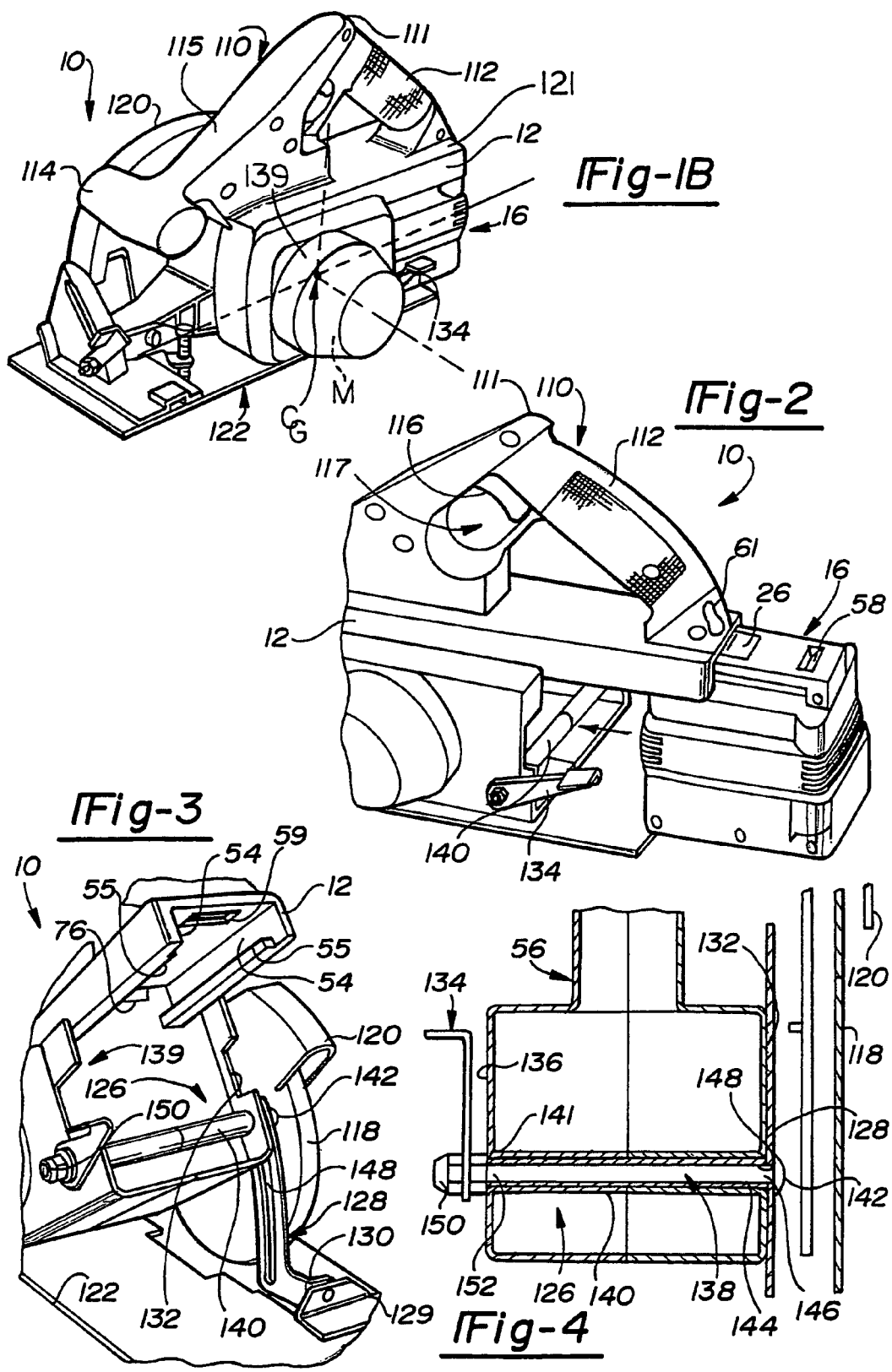

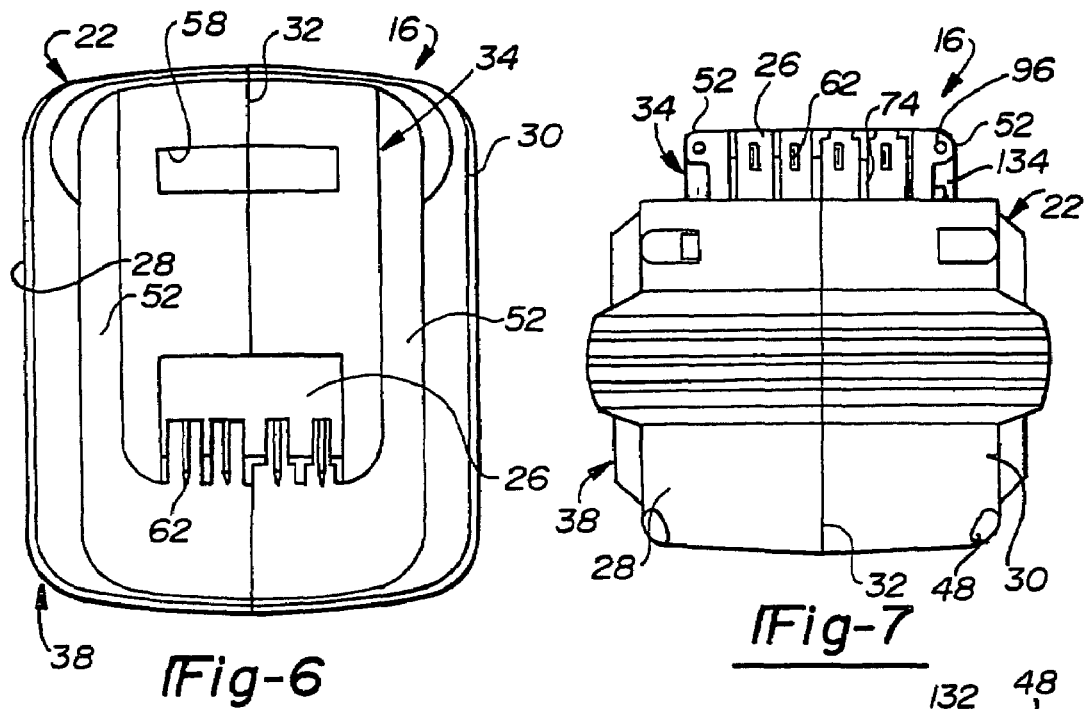
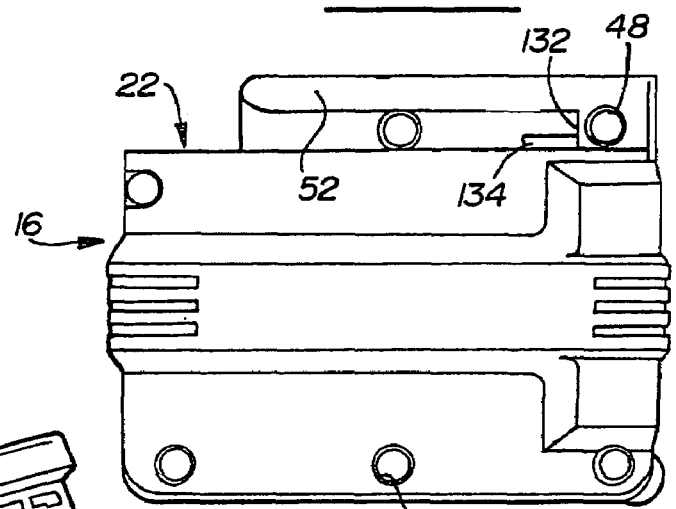
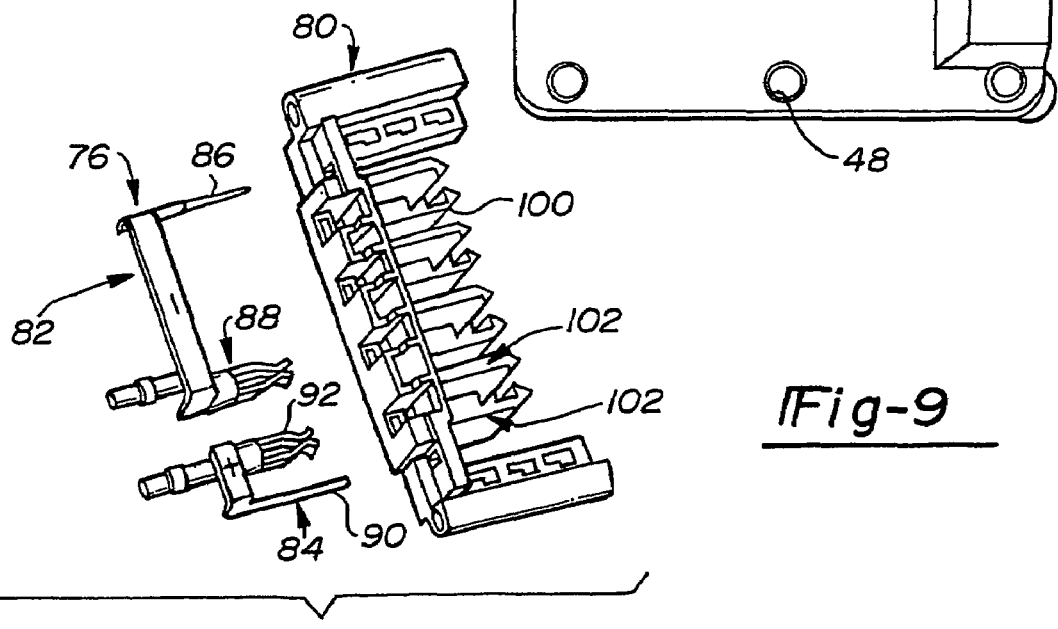

BATTERY POWERED CIRCULAR SAW

CROSS-REFERENCE TO RELATED APPLICATION

This is a continuation-in-part application of U.S. Ser. No. 09/133,924, filed Aug. 13, 1998, now U.S. Pat. No. 6,057,608

BACKGROUND OF THE INVENTION

1. Technical Field

The present invention generally pertains to power tools. More particular, the present invention pertains to a battery powered circular saw.

2. Discussion

It is now well known to power various tools with rechargeable batteries. For example, commonly assigned U.S. Pat. No. 3,757,194 discloses a cordless power tool having a removable battery pack. In the embodiment illustrated, the cordless power tool is a shrub and hedge trimmer powered by a battery pack removably attached to a motor housing. Advantageously over corded tools, such battery powered tools are not limited to use where a power cord can reach an electrical outlet. Moreover, such battery powered tools do not have cords which may inconvenience tool operation or which may be inadvertently severed during tool use.

To a more limited extent, it has been heretofore proposed to power a circular saw with a rechargeable battery. For example, U.S. Pat. No. 4,555,849 discloses a portable electric circular saw which operates on a rechargeable battery. The disclosed tool includes a rechargeable battery removably insertable into a laterally extending battery chamber. U.S. Pat. No. 4,955,849 fails to disclose any mechanism for locking the base relative to the housing at a desired depth of cut.

While prior efforts to power a circular saw with a removable battery may have attained limited success, they have all been associated with disadvantages. For example, packaging restrictions are significant due to the size of rechargeable batteries required for powering a circular saw. In this regard, incorporation of commercially desirable features such as a readily accessible locking mechanism for locking an adjustable base or shoe relative to a housing for establishing a desired depth of cut has been curtailed in prior known arrangements. Many circular saws have a depth of cut lever located at the rear of the saw, directly adjacent the blade guard, between the guard and the handle in the top view. Easy access to this area when releasing or locking the lever can be difficult. Some corded saws have moved this control to a more convenient location at the left rear side of the saw so that it is between the user and the saw's handle. On known cordless circular saws, the location of the battery restricts access and ability to use this area.

It is also desirable to further ergonomically improve battery powered circular saws.

SUMMARY OF THE INVENTION

It is a general object of the present invention to provide an improved battery powered circular saw which overcomes the disadvantages of prior constructions, including but not limited to the disadvantages discussed above.

It is another object of the present invention to provide a depth of cut locking mechanism for a battery powered circular saw which is easy to access.

It is a related object of the present invention to provide a battery powered circular saw having a depth of cut locking mechanism including a tightening bolt which passes through the body of the saw forward of the battery, thereby allowing the lever to be conveniently located on the left side of the saw between the user and the saw handle.

It is another object of the present invention to provide a battery powered circular saw which is ergonomically improved.

In one form, the present invention provides a battery powered circular saw including a housing having first and second sidewalls which are laterally spaced apart. The battery powered circular saw further includes a rechargeable battery removably attached to the housing and an adjustable shoe pivotally attached to the housing for controlling a depth of cut. The battery powered circular saw further includes a locking mechanism for preventing relative movement between the adjustable shoe and the housing. The locking mechanism includes a depth of cut strap disposed adjacent the first sidewall, a lever disposed adjacent the second sidewall and a fastening element interconnecting the depth of cut strap and the lever.

In another form, the present invention provides a battery powered circular saw including a housing defining a pair of longitudinally extending grooves, the battery powered circular saw additionally includes a handle extending from the housing. The handle is disposed substantially parallel to a direction of cut and oriented horizontally above the housing. The battery powered circular saw further includes a rechargeable battery pack removably attached to the housing. The rechargeable battery pack includes a pair of laterally spaced apart guide rails which cooperate with the pair of longitudinally extending grooves to permit sliding movement of the rechargeable battery pack in a direction parallel to the direction of cut.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 1B is a front perspective view of the battery powered circular saw of the present invention.

FIG. 2 is a rear perspective view of a portion of the battery powered circular saw of the present invention shown as a rechargeable battery pack is being installed.

FIG. 3 is rear perspective view of a portion of the battery powered circular saw of the present invention shown with an adjustable shoe rotated to an extended position.

FIG. 4 is a vertical cross-sectional view taken through a depth of cut locking mechanism.

FIG. 6 is a top view of the rechargeable battery pack.

FIG. 7 is a front view of the rechargeable battery pack.

FIG. 8 is a left side view of the rechargeable battery pack.

FIG. 9 is an enlarged and exploded perspective view of a tool terminal block carried by the battery powered circular saw of the present invention.

DETAILED DESCRIPTION OF THE PREFERRED EMBODIMENT

Figure 1A:
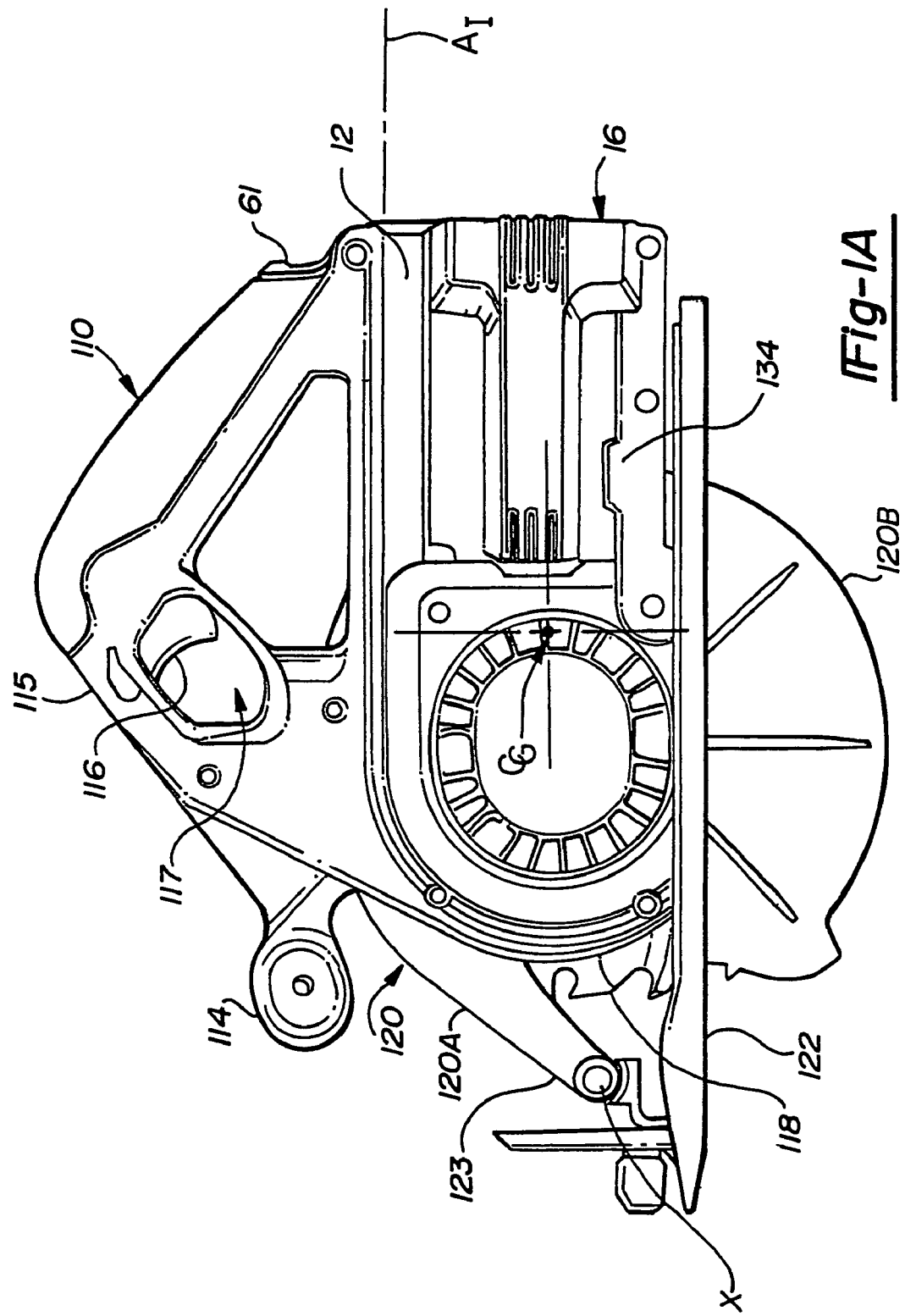
FIG. 1A is a side view of a battery powered circular saw constructed in accordance with the teachings of a preferred embodiment of the present invention.
Figure 5:
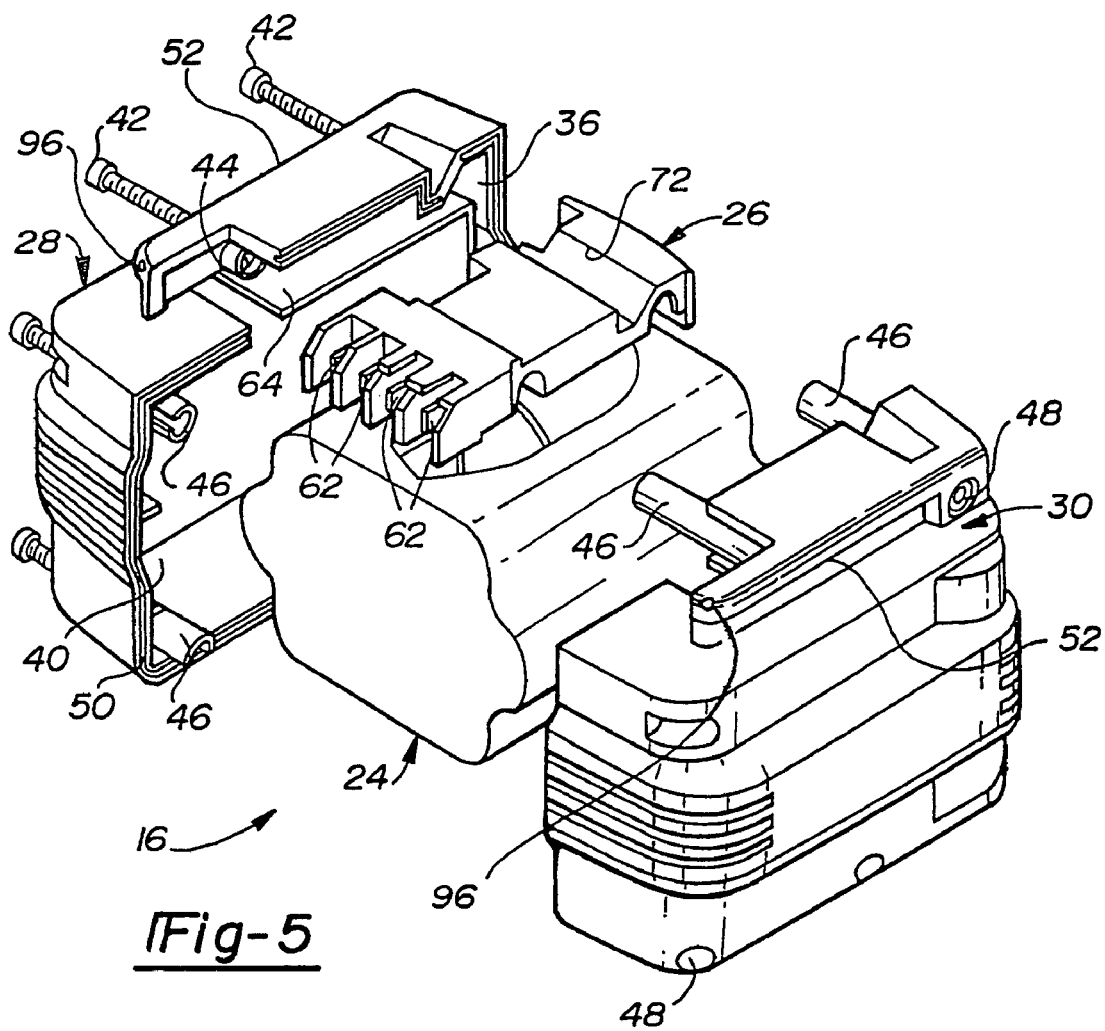
FIG. 5 is an enlarged and exploded perspective view of the rechargeable battery pack of the battery powered circular saw of the present invention.

Referring initially to FIGS. 1A through 3 of the drawings, a battery powered circular saw constructed in accordance with the teachings of a preferred embodiment of the present invention is generally identified with reference numeral 10. The circular saw or tool 10 is shown to generally include a housing 12 for accommodating a motor (not shown). The tool further includes a rechargeable battery pack 16 removably attached to the housing in a manner which will be discussed in detail below. Briefly, the battery pack 16 may be slidably installed to the housing 12 alone an insertion axis $A_I$ and may be positioned such that the center of gravity $C_G$ of the circular saw 10 is aligned laterally (i.e., side-to-side in the present context) and/or longitudinally (i.e., fore-aft in the present context) with a trigger 116. It will become apparent below that certain aspects of the present invention may be applied to alternative types of battery powered tools.

One aspect of the present invention is particularly directed to an arrangement for locking the battery powered circular saw 10 at a desired depth of cut. Another aspect of the present invention is particularly directed to an arrangement for such a tool which is ergonomically improved. Before addressing these particular features of the present invention, an understanding of certain aspects of the exemplary tool, including the rechargeable battery pack 16 and the electrical interface between the battery pack 16 and the tool housing 12 is warranted.

With continued reference to FIGS. 1–3 and additional reference to FIGS. 5–8, the rechargeable battery pack 16 is illustrated to generally include a housing 22, a battery 24 which in the exemplary embodiment illustrated is a 24 volt nickel-cadmium battery, and a battery pack terminal block 26. The housing 22 is shown to include first and second clam shell halves 28 and 30 which are joined at a longitudinally extending centerline or parting line 32. The first and second clam shell halves 28 and 30 of the housing 22 form an upper portion 34 defining a first chamber 36 and a lower portion 38 defining a second chamber 40. The lower portion 38 includes first and second laterally spaced apart sides 41 and 43. The first chamber 36 receives the battery pack terminal block 26, while the second chamber 40 receives the battery 24. In one application, the battery pack housing 22 has an overall length of approximately 11.5 cm, an overall width of approximately 9.5 cm, and an overall height of approximately 9.5 cm.

In the exemplary embodiment, the first and second clam shell halves 28 and 30 of the housing 22 are unitarily constructed from a rigid plastic or other suitable material. The first and second clam shell halves 28 and 30 are joined by thread-forming fasteners 42. The thread-forming fasteners 42 pass through cooperating apertures 44 and screw boss portions 46 integrally formed with the clam shell halves 28 and 30. The fasteners 42 form threads in screw boss portions 46. In the exemplary embodiment illustrated, the first clam shell half 28 of the housing 22 is formed to include a peripheral groove 50 adapted to receive a mating rib (not specifically shown) peripherally extending about the second clam shell half 30.

To facilitate releasable attachment of the battery pack 16 to the tool 10, the upper portion 34 of the housing 22 is formed to include a pair of guide rails 52. The guide rails 52, which will be described further below, are slidably received into cooperating grooves 54 defined by longitudinally extending rails 55. To further facilitate removable attachment of the battery pack 16 to the tool 10, the upper portion 34 of the housing 22 defines a recess 58. The recess 58 is adapted to receive a latch pawl 59 (shown in FIG. 3) carried by the housing 12 of the tool 10. The latch pawl 59 is conventional in construction and operation and is spring biased to a downward position so as to engage the recess 58 upon insertion of the rechargeable battery pack 16. Removal of the battery pack 16 is thereby prevented until the spring bias of the latch pawl 59 is overcome through manual operation of a button 61. The button 61 functions in a conventional manner insofar as the present invention is concerned.

The battery pack terminal block 26 is illustrated to generally include a main body portion 60 constructed of rigid plastic or other suitable material and a plurality of terminals 62. The terminals 62 are generally planar-shaped blade terminals each oriented in a plane substantially perpendicular to a floor 64 (shown in FIG. 5) partially defining the upper chamber 36 of the housing 22. Each blade terminal 62 includes a first end 66 which downwardly extends from the main body portion 60 and is electrically connected with the battery 24 in a conventional manner. The blade terminals 62 further include a second end 68 which forwardly extends. In the preferred embodiment, the second ends 68 of the terminals 62 are upwardly spaced from the floor 64.

The main body 60 of the battery pack terminal block 26 is shown captured between the clam shell halves 28 and 30 of the housing 22. This arrangement improves assembly by allowing the battery pack terminal block 26 to first be electrically attached to the battery 24 and subsequently captured between the clam shell halves 28 and 30. The main body 60 is shown to include a pair of arcuate grooves 70 provided in a bottom side thereof for accommodating the screw boss portions 46 of the housing 22 upon assembly. Similarly, an upper side of the main body 60 includes a recess 72 for accommodating the portion of the housing 22 that defines the recess 58 in the housing 22. The main body portion 60 is further shown to include a plurality of insulating portions 74 interdisposed between adjacent terminals 62 and also positioned outboard of each of the outermost terminals 62.

In the exemplary embodiment illustrated, the battery pack terminal block 26 includes four blade terminals 62. Two of the blade terminals 62 are the positive and negative terminals for the battery 24. A third terminal 62 may be used to monitor temperature of the battery 24 and a fourth terminal may be used for battery identification. The particular functions of the third and fourth blade terminals 62 are beyond the scope of the present invention.

Figure 11:
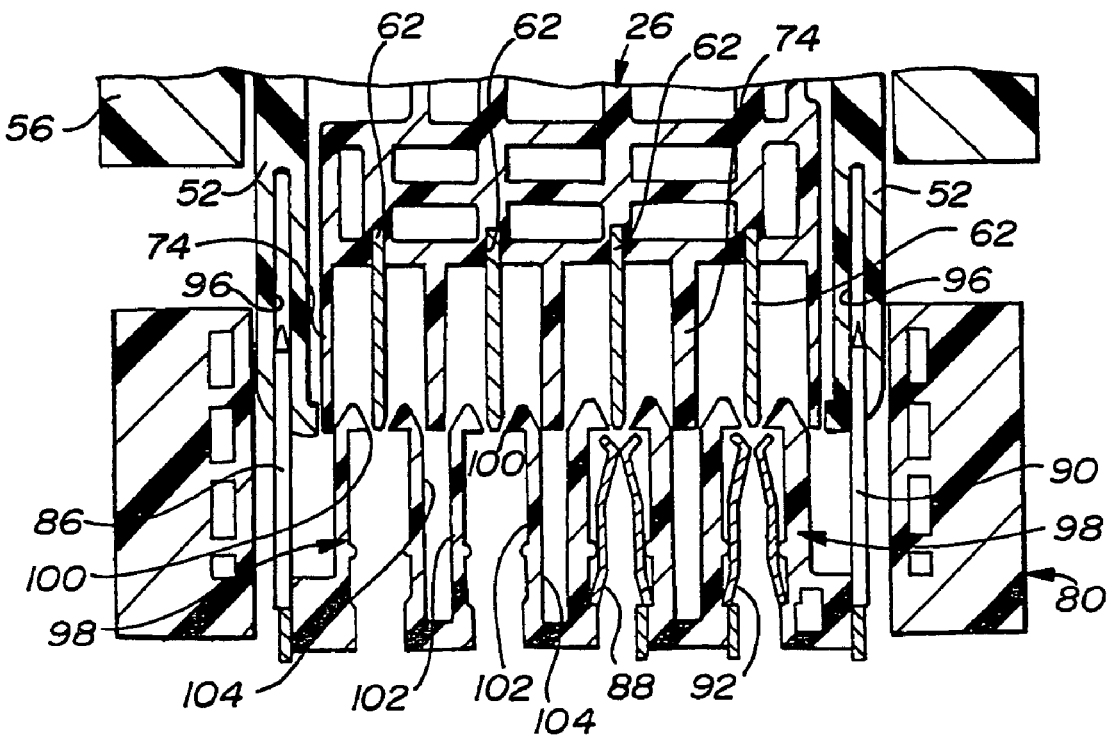
FIG. 11 is a cross-sectional view illustrating the interface between the battery pack and tool.
Figure 10:
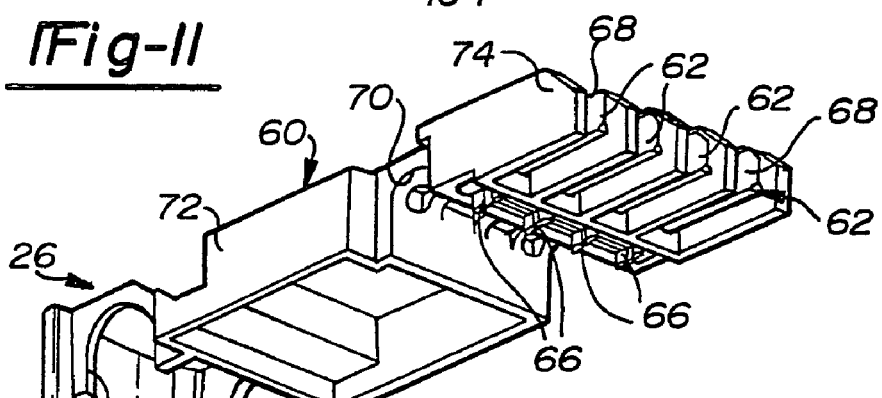
FIG. 10 is a perspective view of the battery pack terminal block of the rechargeable battery pack.

With particular reference now to FIGS. 9 and 11, a terminal block 76 carried by the tool 10 is illustrated to generally include a main body portion 80, a first or negative terminal member 82, and a second or positive terminal members 84. The first terminal member 82 includes a negative male terminal 86 and a negative female terminal 88. Similarly, the second terminal member 84 includes a positive male terminal 90 and a positive female terminal 92. As will be further discussed below, the female terminals 88 and 92 are adapted to receive the positive and negative blade terminals 62 of the battery pack terminal block 26. The male terminals 86 and 90 are adapted to electrically attach the tool 10 to a charger (not shown). As shown in FIG. 11, when the battery pack 16 is operatively attached to the tool 10, the male terminals 86 and 90 of the tool terminal block 76 are received within apertures 96 provided in each of the rails 52. It will be understood that the male terminals 86 and 90 serve no electrical function when the battery pack 16 is attached to the tool 10.

As shown particularly in the cross-sectional view of FIG. 11, the main body 80 of the tool terminal block 76 includes a plurality of window frames 98 which each define a window or opening 100 for receiving and guiding one of the blade terminals 62. The female terminals 88 and 92 of the tool terminal block 76 are disposed within adjacent ones of the window frames 98. The window frames 98 each include a pair of longitudinally extending legs 102. Openings 104 are provided between adjacent window frames 98 for receiving the insulating portions 74. The ends of each of the legs 102 of the frames 98 are generally triangular in shape so as to define lead-in surfaces for the insulating portions 74 into the openings 104 and also for the terminal blades 62 into their respective opening 100.

The battery powered circular saw 10 of the present invention is shown to further include a longitudinally extending handle 110. The handle 110 defining a longitudinal handle axis includes a generally V-shaped member having a centrally located apex 111. A rear leg 112 of the handle 110 serves as a first or rear gripping portion. A second gripping portion 114 forwardly extends from a forward leg 115 of the V-shaped member. The second gripping portion 114 is generally cylindrical and is transversely aligned. The handle 110 carries a trigger 116 for actuating the motor in a conventional manner. The trigger 116 is disposed in an opening 117 adapted to receive an index finger of the tool user. In the embodiment illustrated, the handle 110 is oriented horizontally above the tool housing 12 and generally parallel to a rotatable saw blade 118. The plane in which the saw blade resides defines a direction of cut. The saw blade 118 is partially shielded by a blade guard assembly 120. The guard assembly 120 is illustrated to include a fixed or upper portion 120a and a movable or lower portion 120b.

When the battery pack 16 is completely installed, as shown in FIGS. 1A and 1B, the battery pack 16 is substantially longitudinally positioned under the handle 110. Further, the battery pack 16 is laterally centered under the handle 110 and oriented 90° with respect to a spindle axis of the tool 10. In the preferred embodiment, the center of gravity of the tool 10, including the battery pack 16 is longitudinally and laterally aligned with the trigger 116. The handle 110 effectively bridges the weights of the motor and the battery pack 16 such that a fulcrum or balance point is established in close proximity to the trigger 116. As a result, minimal or no moment arms are presented when the tool 10 is operatively grasped by the user, thereby improving ergonomics of the tool 10.

In the embodiment illustrated, the rails 55 and the grooves 54 defined thereby are oriented parallel to the handle 110. Further, the rails 55 are provided on an underside of a cantilevered portion or battery connection portion 121 of the housing 12 which rearwardly extends from a forward portion 123 and which is coupled to a rearward end of the handle 110. Releasable attachment of the battery pack 16 to the housing 12 is accomplished by first engaging the rails 52 with the grooves 54. Next, the battery pack 16 is translated relative to the housing 16 in a direction parallel to the direction of cut. Gross alignment of the battery pack terminal block 26 with the tool terminal block 76 is obtained through such sliding engagement of the rails 52 of the battery pack 16 with the grooves 54. Fine alignment of the battery pack terminal block 26 and tool terminal block 76 is provided after the guide rails 52 have advanced substantially along the grooves 54.

The battery powered circular saw 10 is further shown to include an adjustable shoe 122 pivotally attached to a forward portion 123 of the guard assembly 120 for rotation about a pivot axis X. As will be appreciated by those skilled in the art, the shoe 122 may be adjusted for controlling the depth of cut. FIGS. 1A and 1B illustrate the battery powered circular saw 10 with the shoe 122 adjusted to a relatively deep cut. FIG. 3 illustrates the battery powered circular saw 10 adjusted to a more shallow cut.

With continued reference to FIGS. 2 and 3 and additional reference to FIG. 4, the battery powered circular saw 10 of the present invention is illustrated to include a locking mechanism 126 for selectively locking the adjustable shoe 122 relative to the housing 12 at a desired depth of cut. The locking mechanism 126 includes a depth of cut strap 128. The depth of cut strap 128 includes a pivoting bracket 129 at its end 130 which is secured to the adjustable shoe 122. The depth of cut strap 128 is arcuate in shape and is disposed between a first side 132 of the housing 12 and the guard assembly 120.

Fixation of the adjustable shoe 122 at a selected depth of cut is controlled by a manual leer 134 disposed adjacent a second side 136 of the housing 56. The lever 134 is carried by a through bolt 138 which passes through a boss-type portion 140 defined by the housing 12. The through bolt 138 is shown extending through an opening or free space provided between the battery 16 and a motor/gear box area or motor housing portion 139 of the tool 10. The motor housing portion 139 is employed to house a motor M having a rotational axis about which the circular saw blade 118 is rotatable disposed.

In the preferred embodiment, a hollow sleeve 148 is positioned between the boss portion 140 and the through bolt 138 to facilitate relative rotation and to ensure that the first side 132, and the second side 136 of the housing 12, cannot be compressed when tightening the manual lever 134. The through bolt 138 has an externally threaded shaft 141 and includes a head 142 carried at a first end 144 of the through bolt 138. A non-circular portion 146 of the through bolt 138 is slidably received within an elongated groove 148 of the strap 128 so as to prevent relative rotation. The lever 134 is fixedly attached to a nut 150, which in turn is threadably received by a second end 152 of shaft 141.

Movement of the lever 134 functions to translate the through bolt 138 toward the nut 150, thereby causing the strap 128 to be drawn against the side 132 of the housing 12. As a result, movement of the strap 128 relative to the housing 12 is arrested and the adjustable shoe 122 is thereby fixed relative to the housing 12 establish a desired depth of cut.

What is claimed is:

1. A circular saw comprising:
    a housing having a motor housing portion and a battery connection portion, the battery connection portion extending rearwardly from the motor housing portion;
    a circular saw blade coupled to the housing and rotatable about a rotational axis;
    a handle coupled to the housing, the handle being disposed perpendicular to the rotational axis and having first and second ends, the first end of the handle being coupled to the motor housing portion, the second end of the handle being disposed rearwardly and below the first end of the handle and being coupled to the battery connection portion;

a battery pack that is removably coupled to the battery connection portion of the housing, the battery pack being moveable in first and second directions that are generally parallel to the circular saw blade;

a shoe assembly coupled to the housing, the shoe assembly having a shoe and an adjustment mechanism for selectively adjusting a position of the shoe relative to the housing, the adjustment mechanism including a depth-of cut member that is coupled to the shoe and a clamp that is coupled to the housing forwardly of the second end of the handle, the clamp being selectively operable for drawing the depth-of-cut member against the housing to thereby inhibit movement of the depth-of-cut member relative to the housing.

2. The circular saw of claim 1, wherein one of the battery connection portion and the battery pack includes a pair of grooves and the other one of the battery connection portion and the battery pack in includes a pair of rails that cooperate with the pair of grooves to align the battery pack to the housing.

3. The circular saw of claim 1, wherein a center of gravity of the circular saw including the battery pack is located in-line with a center of the handle.

4. The circular saw of claim 3, wherein the handle has a generally V-shaped portion and a trigger is mounted in an apex of the generally V-shaped portion of the handle.

5. The circular saw of claim 4, wherein the center of gravity is disposed in-line with the trigger in a direction that is perpendicular to both the rotational axis and a direction in which the battery pack is releasably engaged to the housing.

6. The circular saw of claim 2, wherein a tool terminal block is mounted on the battery connection portion, the tool terminal block having a plurality of first terminals, and wherein the battery pack includes a terminal block having a plurality of second terminals that engage the first terminals when the battery pack is positioned in a fully inserted position in which the battery pack is fixedly but removably coupled to the battery connection portion.

7. The circular saw of claim 6, wherein one of the first and second terminals is a male spade terminal and the other one of the first and second terminals is a female terminal into which an associated one of the male spade terminals is slidingly received.

8. The circular saw of claim 6, wherein the tool terminal block defines a plurality of window frames into which an associated one of the first terminals is disposed and wherein the terminal block includes a plurality of insulating portions, each insulating portion contacting at least one associated window frame as the battery pack is being moved into the fully inserted position.

9. The circular saw of claim 6, wherein the clamp includes a clamp lever that is rotatably mounted to the housing, the clamp lever being disposed on a side of the battery pack opposite the circular saw blade.

10. The circular saw of claim 6, wherein the clamp includes a clamp lever that is rotatably mounted to the housing, the clamp lever being disposed on a side of the handle opposite the circular saw blade.

11. The circular saw of claim 10, wherein the clamp includes a bolt that is fitted through a boss on the housing.

12. The circular saw of claim 11, wherein a non-circular portion of the bolt extends into an elongated groove formed in the depth-of-cut member to thereby resist rotation of the bolt relative to the depth-of-cut member.

13. The circular saw of claim 12, wherein a threaded member is coupled to an end of the bolt opposite the non-circular portion, the threaded member being rotatable relative to the bolt to permit the bolt to translate along an axis that is generally parallel to the rotational axis.

14. The circular saw of claim 11, wherein a hollow sleeve is received within the boss.

15. A circular saw comprising:

a housing having a motor housing portion and a battery connection portion, the battery connection portion extending rearwardly from the motor housing portion;

a circular saw blade coupled to the housing and rotatable about a rotational axis;

a handle coupled to the housing, the handle being disposed perpendicular to the rotational axis and having first and second ends, the first end of the handle being coupled to the motor housing portion, the second end of the handle being disposed rearwardly and below the first end of the handle and being coupled to the battery connection portion;

a battery pack that is removably coupled to the battery connection portion of the housing, the battery pack being moveable in first and second directions that are generally parallel to the circular saw blade;

a shoe assembly coupled to the housing, the shoe assembly having a shoe and an adjustment mechanism for selectively adjusting a position of the shoe relative to the housing, the adjustment mechanism including a depth-of-cut member that is coupled to the shoe and a clamp that is coupled to the housing, the clamp being selectively operable for drawing the depth-of-cut member against the housing to thereby inhibit movement of the depth-of-cut member relative to the housing;

wherein the clamp is mounted to the housing at a location forwardly of the battery pack when the battery pack is positioned in a fully inserted position in which the battery pack is fixedly but removably coupled to the battery connection portion.

16. The circular saw of claim 15, wherein the clamp includes a clamp lever that is rotatably mounted to the housing, the clamp lever being disposed on a side of the battery pack opposite the circular saw blade.

17. The circular saw of claim 15, wherein the clamp includes a bolt that is fitted through a boss on the housing.

18. The circular saw of claim 17, wherein a non-circular portion of the bolt extends into an elongated groove formed in the depth-of-cut member to thereby resist rotation of the bolt relative to the depth-of-cut member.

19. The circular saw of claim 18, wherein a threaded member is coupled to an end of the bolt opposite the non-circular portion, the threaded member being rotatable relative to the bolt to permit the bolt to translate along an axis that is generally parallel to the rotational axis.

20. The circular saw of claim 17, wherein a hollow sleeve is received within the boss.

21. The circular saw of claim 17, wherein the housing further includes a guard in which the circular saw blade is rotatably disposed and wherein the boss is formed in motor housing portion, the battery connection portion or both the motor housing portion and the battery connection portion.

22. The circular saw of claim 17, wherein one of the battery connection portion and the battery pack includes a pair of grooves and the other one of the battery connection portion and the battery pack in includes a pair of rails that cooperate with the pair of grooves to align the battery pack to the housing.

23. The circular saw of claim 22, wherein a tool terminal block is mounted on the battery connection portion, the tool terminal block having a plurality of first terminals, and wherein the battery pack includes a terminal block having a plurality of second terminals that engage the first terminals when the battery pack is positioned in a fully inserted position in which the battery pack is fixedly but removably coupled to the battery connection portion.

24. The circular saw of claim 23, wherein one of the first and second terminals is a male spade terminal and the other one of the first and second terminals is a female terminal into which an associated one of the male spade terminals is slidingly received.

25. The circular saw of claim 23, wherein the tool terminal block defines a plurality of window frames into which an associated one of the first terminals is disposed and wherein the terminal block includes a plurality of insulating portions, each insulating portion contacting at least one associated window frame as the battery pack is being moved into the fully inserted position.

26. The circular saw of claim 23, wherein a center of gravity of the circular saw including the battery pack is located in-line with a center of the handle.

27. The circular saw of claim 26, wherein the handle includes a generally V-shaped portion and a trigger is mounted in an apex of the generally V-shaped portion of the handle.

28. The circular saw of claim 27, wherein the center of gravity is disposed in-line with the trigger in a direction that is perpendicular to both the rotational axis and a direction in which the battery pack is releasably engaged to the housing.

29. A circular saw comprising:
a housing;
a guard coupled to the housing;
a circular saw blade associated with the housing and laterally positioned within the guard, the circular saw blade being rotatable about a rotational axis;
a handle with a generally V-shaped portion coupled to the housing, the generally V-shaped portion being disposed generally transverse to the rotational axis and having a first end, a second end that is positioned rearward of the first end, an apex, which is disposed above the housing between the first and second ends;
a battery pack fixedly but releasably engaged to the housing;
a pair of grooves formed on one of the battery pack and the housing;
a pair of rails formed on the other one of the battery pack and the housing, the rails being configured to cooperate with the grooves to align the battery pack to the housing such that a center of the battery pack is laterally aligned to a center of the generally V-shaped portion;
a shoe; and
an adjustment mechanism having a first bracket, a depth-of-cut member and a clamp, the first bracket being fixedly coupled to the shoe, the depth-of-cut member being pivotally coupled to the first bracket and having an arcuate groove formed therein, the clamp including a bolt and a threaded member, the bolt having a non-circular portion that is disposed in the arcuate groove of the depth-of-cut member, the bolt extending through a boss formed in the housing, the threaded member being threadably engaged to the bolt and being configured to translate the bolt within the boss to selectively secure the depth-of-cut member to the housing, the bolt being disposed between the rotational axis and an aft end of the battery pack when the battery pack is fixedly but releasably engaged to the housing, the threaded member being disposed on a side of the housing opposite the circular saw blade.

30. The circular saw of claim 29, wherein the bolt is disposed between the rotational axis and a forward end of the battery pack.

31. The circular saw of claim 29, wherein a center of gravity of the circular saw including the battery pack is located in-line with a center of the generally V-shaped portion.

32. The circular saw of claim 31, wherein a trigger is mounted in an apex of the generally V-shaped portion.

33. The circular saw of claim 32, wherein the center of gravity is disposed in-line with the trigger in a direction that is perpendicular to both the rotational axis and a direction in which the battery pack is releasably engaged to the housing.

34. A circular saw comprising:
a housing;
a circular saw blade associated with the housing and rotatable about a rotational axis;
a handle with a generally V-shaped portion coupled to the housing, the generally V-shaped portion being disposed generally transverse to the rotational axis and having a first end, a second end that is positioned rearward of the first end, an apex, which is disposed above the housing between the first and second ends;
a battery pack fixedly but releasably engaged to the housing;
a pair of grooves formed on one of the battery pack and the housing;
a pair of rails formed on the other one of the battery pack and the housing, the rails being configured to cooperate with the grooves to align the battery pack to the housing such that a center of the battery pack is laterally aligned to a center of the generally V-shaped portion;
a shoe; and
an adjustment mechanism having a first bracket, a depth-of-cut member and a clamp, the first bracket being fixedly coupled to the shoe, the depth-of-cut member being pivotally coupled to the first bracket and having an arcuate groove formed therein, the clamp including a bolt and a threaded member, the bolt having a non-circular portion that is disposed in the arcuate groove of the depth-of-cut member, the bolt extending through a boss formed in the housing, the threaded member being threadably engaged to the bolt and being configured to translate the bolt within the boss to selectively secure the depth-of-cut member to the housing, the bolt being disposed between the rotational axis and an aft end of the battery pack when the battery pack is fixedly but releasably engaged to the housing, the threaded member being disposed on a side of the housing opposite the circular saw blade;
wherein a center of gravity of the circular saw including the battery pack is located in-line with a center of the generally V-shaped portion, wherein a trigger is mounted in an apex of the generally V-shaped portion and wherein the center of gravity is disposed in-line with the trigger in a direction that is perpendicular to both the rotational axis and a direction in which the battery pack is releasably engaged to the housing.

* * * * *